Oct. 30, 1951 E. J. AMBROSE ET AL 2,573,380
SEALING CEMENT FOR VACUUM SEALS
Filed June 28, 1947
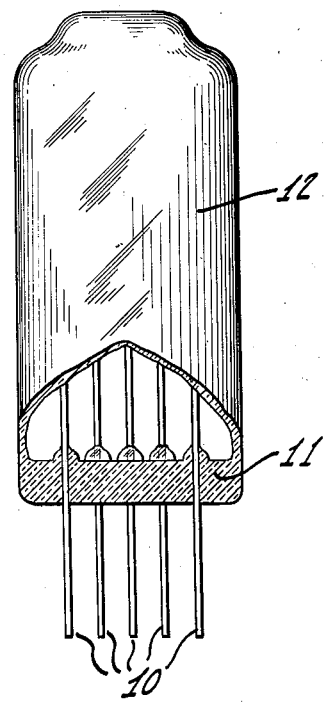
INVENTORS.
EDMUND J. AMBROSE &
ERIC F. McGILL
BY William A. Zalesak
ATTORNEY

UNITED STATES PATENT OFFICE 2,573,380

SEALING CEMENT FOR VACUUM SEALS

Edmund Jack Ambrose and Eric Frederick George McGill, Maidenhead, England, assignors to Electric & Musical Industries Limited, Middlesex, England Application June 28, 1947, Serial No. 757,870
In Great Britain May 7, 1943

Section 1, Public Law 690, August 8, 1946
Patent expires May 7, 1963

2 Claims. (Cl. 106—47)

This invention relates to the manufacture of vacuum seals.

For many purposes it is necessary to make a glass-to-glass or glass-to-metal seal which will withstand a high degree of vacuum and at the same time one which can be heated to a high temperature. For example, in the manufacture of electron discharge devices it is often necessary to seal conductors through the glassware in a vacuum-type manner or to seal one tube or envelope to another and in the manufacture of such devices it is necessary during the evacuation operation to bake the tubes at a high temperature of up to about 450° C. in order to release undesired gases from the glass and the metal parts within the tube or envelope. It is sometimes found that after sealing, for example, a tungsten wire into the glassware that the seal is leaky and that it may be inconvenient to re-make the seal owing to the advanced stage of manufacture at which such leaks become apparent. Also it is sometimes found that minute holes occur in the glassware and whilst it may in some cases be possible to seal these holes by melting the glass, such practice may in other cases be dangerous owing to the possibility of collapsing the glassware. Furthermore, it is not possible to seal all metals in glassware, particularly in glassware made of glass known by the registered trade mark "Pyrex," by the usual process employed in high vacuum technique and in general the leads through the glassware have to be composed of such metals as tungsten.

It is the object of the present invention to provide an improved method of manufacturing a vacuum seal which will withstand a high degree of vacuum and one which can be heated to a high temperature and in which use is made of what will be termed a cement, thus enabling the invention to be employed for overcoming or reducing the difficulties referred to above.

According to one feature of the invention, a method is provided of making a glass-to-glass or a glass-to-metal seal which comprises melting a cement composed of a chloride, bromide or iodide of copper, silver, thallium or lead or a combination of two or more of said halides, onto the glass or glass and metal where the seal is to be effected.

According to another feature of the invention, a method is provided of making a glass-to-glass or glass-to-metal seal which comprises applying to said glass or glass and metal where the seal is to be effected, a flux composed of an alkali metal nitrite, ammonium phosphate or microcosmic salt and then melting onto said flux a cement composed of a chloride, bromide or iodide of copper, silver, thallium or lead in a combination of two or more of said halides.

In carrying out the invention, if, for example, it is found that a leak occurs in a glass-to-metal seal the leak can be sealed by first melting the flux over the vicinity where the leak occurs, the flux for example being applied by forming a bead of the flux on the end of a piece of wire and then melting the flux in a gas flame so that it flows onto the surface to be sealed. Such flux enables either metal or glass to be wetted by the cement which forms an extremely adherent film or coating, the cement being applied in a similar manner by forming a bead on the end of a piece of wire and heating the bead in a reducing flame so as to avoid substantial oxidation of the cement and of the metal and causing the molten cement to run over the surface which has been treated with flux. Particularly effective seals can be produced by using 95% silver iodide and 5% cuprous iodide with the copper in monovalent form, as the cement and potassium nitrite or ammonium phosphate as a flux the iodide being melted onto the surface by employing a small hydrogen flame. It is found that a seal made in this manner can be baked up to about 450° C. without detriment to the seal. The cement should be re-melted momentarily after the baking operation as it is found that iodide tends to recrystallise during the baking operation. Instead of the addition of 5% of cuprous iodide to silver iodide the addition of 5% of silver chloride to silver iodide is also found to produce a particularly tough cement.

In making seals according to the invention a minimum amount of flux should be employed and the cement heated sufficiently to cause decomposition of all the applied flux.

It will of course be appreciated that the baking operation referred to does not form a part of the method of making the seal since the baking operation is essentially a step that is employed in the manufacture of, for example, electron discharge devices.

The present invention can be employed for curing leaks in glass-to-metal seals or in glass-to-glass seals and can also be employed for sealing minute holes such as are sometimes found in glassware. If desired, in order to obviate the necessity of employing tungsten as a metal to be sealed into a glass envelope or tube, it is possible to employ a plug or rivet of any of the metallic halides aforesaid, particularly the silver-copper iodide aforesaid as a conductor passing through a hole in the glassware, the plug or rivet being sealed to the glassware after having treated the plug or rivet and the surface through which is passes with one of the aforesaid fluxes, the surface of the plug or rivet being melted to cause it to adhere to the glass. Also, instead of using a wire or lead of tungsten for sealing in glass known by the registered trade-mark "Pyrex" a lead or conductor of another metal can be employed, such metal being sealed to the glassware by first treating the glass and metal to be sealed with one of the aforementioned fluxes and then applying the cement.

In the drawing, to which reference is now made for a better understanding of the invention, there is shown in the single figure thereof a side view of an electron discharge device partly in section which utilizes lead-ins made of the metallic halides of the invention. The lead-ins 10 pass through the button type stem 11 of the electron discharge device 12. The use of lead-ins made of the novel cement of the invention permits a good seal to be made between the glass stem and the lead-ins without the use of any other helping agent. The application of heat to the lead-ins to cause their surfaces at portions thereof passing through the glass stem 11, to melt, results in an adherence of the lead-ins to the glass of the stem. While seals of this character are good, it is preferable to employ one of the fluxes referred to herein, to treat the lead-ins before effecting the seals.

Whilst the invention has been described above as applied to the making of seals in which a flux is employed prior to the application of the cement, it is possible that some of the halides mentioned can be employed as cements without the use of one of the said fluxes particularly in glass-to-glass seals. Further, although reference has been made to glass and glassware, it is to be understood that these terms are employed broadly so as to include other vitreous materials, such as quartz ceramics or porcelain.

What we claim is:

1. A sealing cement comprising a combination of silver iodide and a compound selected from the group consisting of copper iodide having the composition formula CuI and silver chloride, the amount of said silver iodide being greater than the amount of said compound.

2. A sealing cement comprising a combination of 95% silver iodide and 5% of a compound selected from the group consisting of monovalent copper iodide and silver chloride.

EDMUND JACK AMBROSE.
ERIC FREDERICK GEORGE McGILL.

REFERENCES CITED

The following references are of record in the file of this patent:

UNITED STATES PATENTS

| Number | Name | Date |
|---|---|---|
| 1,601,232 | Blumenberg | Sept. 28, 1926 |
| 2,024,407 | Weis | Dec. 17, 1935 |
| 2,130,879 | Dobke | Sept. 20, 1938 |
| 2,425,403 | Kuan-Han Sun | Aug. 12, 1947 |
| 2,430,539 | Kuan-Han Sun | Nov. 11, 1947 |